US005503380A

United States Patent [19]

Hidding

[11] Patent Number: 5,503,380

[45] Date of Patent: Apr. 2, 1996

[54] METHOD AND APPARATUS FOR ASSEMBLING SETS OF DOCUMENTS

[75] Inventor: Gerhard Hidding, Heerenveen, Netherlands

[73] Assignee: Hadewe B.V., Drachten, Netherlands

[21] Appl. No.: 291,999

[22] Filed: Aug. 18, 1994

[30] Foreign Application Priority Data

Aug. 18, 1993 [NL] Netherlands .......................... 9301429

[51] Int. Cl.$^6$ ............................ B65H 39/02; G06K 9/68

[52] U.S. Cl. .............................................. 270/58; 382/218

[58] Field of Search .......................... 270/54, 58; 382/34; 250/561, 222.1; 271/265.01, 258.01

[56] References Cited

U.S. PATENT DOCUMENTS

| | | | |
|---|---|---|---|
| 3,260,517 | 7/1966 | Sather . | |
| 3,660,670 | 5/1972 | Howard | 250/222 X |
| 3,966,186 | 6/1976 | Helm | 270/58 |
| 4,357,596 | 11/1982 | Feilchenfeld | 235/456 X |
| 4,800,505 | 1/1989 | Axelrod et al. | 270/58 X |
| 4,800,506 | 1/1989 | Axelrod et al. | 270/58 X |
| 4,953,841 | 9/1990 | Polarek | 270/58 |
| 4,958,069 | 9/1990 | Okamori | 250/561 X |
| 5,034,985 | 7/1991 | Keough . | |
| 5,067,088 | 11/1991 | Schneiderhan | 270/58 X |
| 5,084,611 | 1/1992 | Okisu et al. | 250/561 X |
| 5,142,482 | 8/1992 | Sansone | 270/58 X |
| 5,149,977 | 9/1992 | Mita | 250/561 X |
| 5,194,729 | 3/1993 | Okisu et al. | 250/561 X |
| 5,235,652 | 8/1993 | Nally | 382/34 X |
| 5,246,219 | 9/1993 | Watkiss | 270/58 |
| 5,317,654 | 5/1994 | Perry et al. | 270/58 X |
| 5,351,834 | 10/1994 | Duss | 382/34 X |
| 5,364,085 | 11/1994 | Kennish | 270/58 |

FOREIGN PATENT DOCUMENTS

| | | |
|---|---|---|
| 0399808 | 11/1990 | European Pat. Off. . |
| 0531229 | 3/1993 | European Pat. Off. . |
| 3903751 | 9/1990 | Germany . |

*Primary Examiner*—John E. Ryznic
*Attorney, Agent, or Firm*—Burns, Doane, Swecker & Mathis

[57] ABSTRACT

A brightness pattern of a document (71, 101) is stored in a memory. At least a part (73, 102, 105) of another document (71, 101) is optically scanned. The scanned brightness pattern is compared with the stored brightness pattern. When more than a specified minimum extent of agreement between the scanned and the stored brightness patterns is found, a signal is generated. The composition of the set is carried out in accordance with that signal.

Because scanned brightness patterns are compared with a brightness pattern of a document, a random brightness pattern present on a document can be used for controlling the composition of the set.

Further, an apparatus for practicing the method according to the invention is disclosed.

19 Claims, 4 Drawing Sheets

METHOD AND APPARATUS FOR ASSEMBLING SETS OF DOCUMENTS

BACKGROUND OF THE INVENTION

The invention relates to a method for assembling sets of documents wherein documents are successively fed and gathered into sets.

According to a method known from practice, the composition of sets of documents which have been fed separately is controlled by counting, during the formation of each set, the number of documents being fed and discharging gathered documents collectively when according to the count a specified number of documents have been gathered. This number should be set at the desired number of documents per set.

A drawback associated with this known method is that the risk of counting errors is substantial. Moreover, an error also affects the composition of subsequent sets, so that following an error the subsequent sets do not contain the correct documents either but contain one or more documents of a next or a preceding set. Counting errors may for instance arise when two documents are being fed simultaneously instead of consecutively. A further drawback of this known method is that the number of supplied documents that are to be discharged simultaneously as a set has to be set anew whenever a set consisting of a different number of documents than the preceding set is to be gathered. This means that this method does not enable efficient implementation of the composition of sets consisting of different numbers of documents in random order.

According to U.S. Pat. No. 3,260,517, for the composition of sets of documents, use is made of several feeding stations each loaded with a number of identical documents. For the composition of the sets, documents are fed by one or more of the feeding stations. For each set, different combinations of feeding stations can be selected for feeding documents. The selection of the feeding stations occurs in accordance with signals which have been read from a main document. These signals represent the set composition instructions for a set to be composed starting from the main document in question.

A drawback of this known method is that for each series of sets to be composed, it must be specified which documents are to be loaded into which feeding stations, and that these documents must then be loaded into the feeding stations prior to the preparation of that series of sets.

A further drawback is that if an error is made in drawing up the specification of the documents to be loaded into the feeding stations or in loading those documents, so that a feeding station is loaded with other documents than was envisaged in drawing up the main document, a different document than intended will be added to the main document upon activation of the feeding station in question.

SUMMARY OF THE INVENTION

The object of the invention is to provide a method whereby in a simple manner the feeding of documents to a set can be controlled for the preparation of sets with different configurations in a random order, without the necessity of providing particular marks on the documents to be recognized and without the necessity of interpreting a brightness pattern scanned from the document.

This object is realized in accordance with the present invention in that brightness patterns are optically scanned from at least parts of at least some of the documents and the scanned brightness patterns are each compared with at least one reference brightness pattern of a specific type or category of documents, which reference brightness pattern or patterns are stored in a memory. Signals signifying whether a specified minimum extent of agreement between the compared brightness patterns has been found are generated, and the composition of gathered sets of documents is controlled in accordance with these signals.

Because a brightness pattern of at least a part of a document is stored as a reference and a brightness pattern scanned from a document is compared with the stored reference brightness pattern, random brightness patterns present on a specific type or category of documents can be used to determine whether any agreement exists and to generate a signal in response to which the control system controls the composition of the set in the desired manner. Accordingly, it is not necessary to provide specific marks with a predetermined meaning on a document. Any distinguishable brightness pattern present on a document of a particular type or category can be used.

The invention can further be embodied in an apparatus adapted for the practice of the method according to the invention.

Particular elaborations and embodiments of the invention are set forth in the depending claims.

BRIEF DESCRIPTION OF THE DRAWINGS

Hereinafter the invention is further explained on the basis of an exemplary embodiment with reference to the drawing. In the drawing.

DETAILED DESCRIPTION OF THE INVENTION

Figure 1:
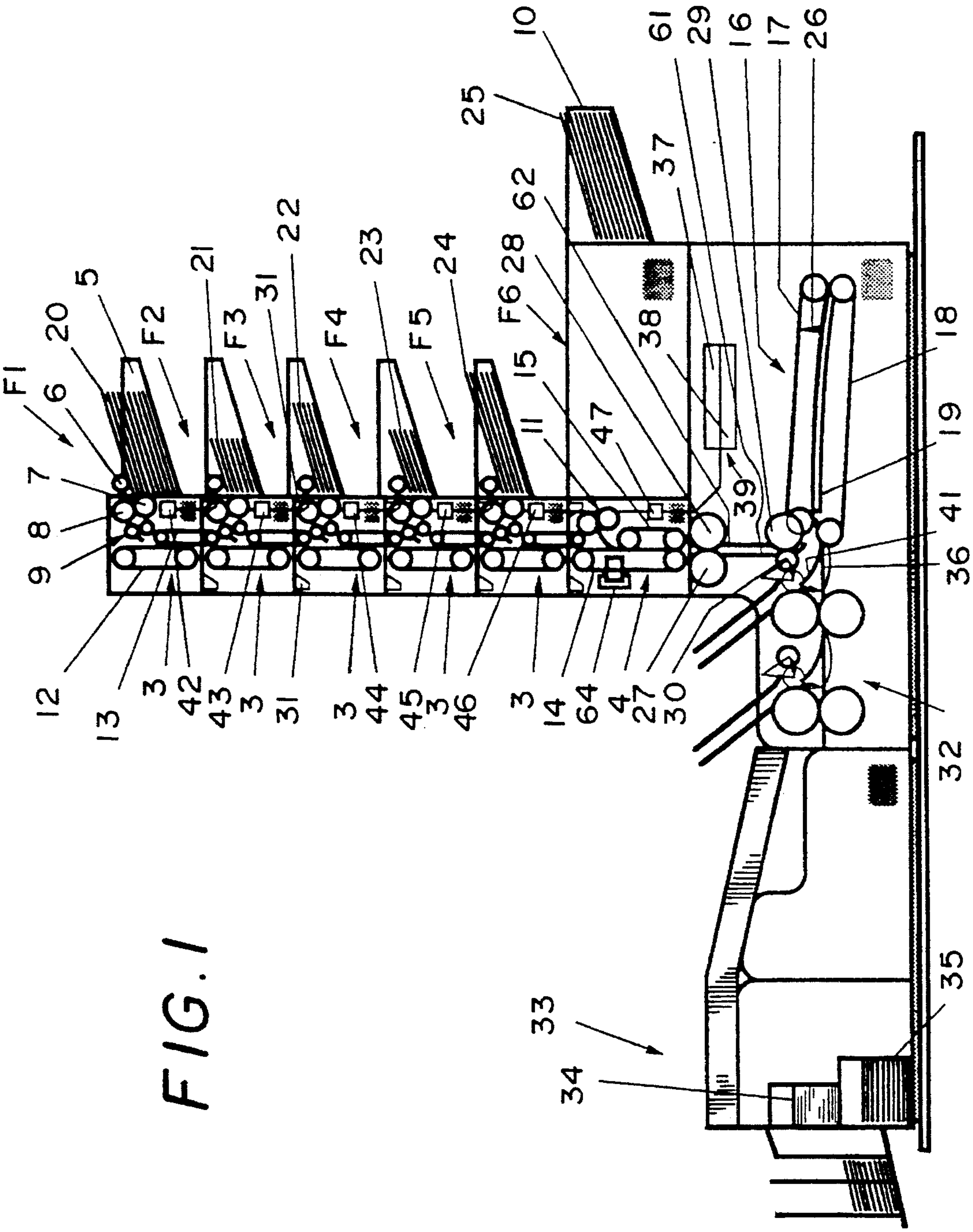
FIG. 1 is a cutaway side elevation of an apparatus for practicing the method according to the invention.

First the most preferred exemplary embodiment of a system according to the invention for composing sets of documents as shown in FIG. 1 is further explained.

The system is equipped with a plurality of feeding stations F1–F6 for feeding documents 20–25.

The first five feeding stations F1–F5 are each designed as a station for singulating and feeding sheets from a stack. Each of these feeder stations F1–F5 comprises a paper storage tray 5, a supply roller 6, a separation roller 7, a transport roller 8 and a pair of feed rollers 9. An example of a separation device suitable for use in a feeder station F1–F5 according to the exemplary embodiment shown, is described in more detail in applicant's U.S. Pat. No. 5,362,037, incorporated herein by reference.

The last feeding station F6 is designed as a printer with a tray 10 for printing sheets and a pair of feed rollers 11 for feeding a printed sheet at an appropriate time. Preferably, the printer is so designed that the printing of a sheet is always completed before the sheet reaches a waiting position between the feed rollers 11.

The feeding stations F1–F6 are united with transport means 3, 4 to form feeding-transport units, which can be connected to each other. The transport means 3 connected with the feeder stations F1–F5 each comprise mutually staggered conveyor belts 12, 13, partly located opposite each other. The downstream conveyor belt 13 of an upstream transport unit extends to a point opposite an upstream conveyor belt 12 or 14 of a next, downstream transport unit 3 or 4. Thus a document can be passed on to a next transport unit 3 or 4. The last transport unit 4 comprises opposite conveyor belts 14, 15 which end straight opposite to each other.

The feeding-transport units equipped with a feeder station F1–F5 are provided with legs 31 which, in assembled condition, project into a subjacent station. By virtue of these legs 31 the downstream conveyor belt 13 remains clear of a supporting surface when a disassembled feeding-transport unit is set down on such supporting surface.

The system further comprises a gathering and aligning station 16 for gathering documents in a gathering position into a set in the form of an aligned stack with document edges substantially in alignment on one side.

The aligning station 16 is designed as a head station with a supply track, an aligning surface with a movable stop 26 and a discharge track 36 in line with the aligning surface 19. The supply track is formed by transport rollers 27, 28, 29, 30 and guides 61, 62 and the aligning surface is formed by a portion of a conveyor belt 18 that runs over a support 19. Documents supplied by the transport unit 4 can be passed by way of this supply track to the aligning surface 19.

The documents can be transported in the direction of supply as far as the stop 26 and then be discharged in the opposite direction. The aligned document edges form the trailing edge of the stack, which is advantageous in folding the stack. In the folding station 32, the position of each fold is defined with respect to the trailing edge of the stack of documents.

The stop 26 is fixed to the conveyor belt 18. The stop can be moved by running the conveyor belt 18.

Arranged opposite the aligning surface 19 are pressing means 17 which are movable in the direction of the stop 26 approximately parallel to the aligning surface 19, are capable of exerting some pressure on the aligning surface 19 and have a greater coefficient of friction relative to documents than does the aligning surface. By displacing the pressure means in the direction of the stop 26, documents present between the aligning surface and the pressure means can be urged against the stop, so that the document edges on the side of the stop 26 are aligned relative to each other.

The aligning surface 19 is convexly curved in the direction of displacement of the stop 26. The pressure means are designed as an endless belt 17 tensioned with a particular tension, one end thereof extending along the aligning surface 19. Because of the tension of the endless belt 17 of the pressure means, this belt exerts, in the area adjacent the stop 26, a uniformly distributed pressure in the direction of the aligning surface 19.

The conveyor belt 17 has a greater coefficient of friction relative to the material of the documents than does the conveyor belt 18. By driving the conveyor belt 17 for exerting a force on a document located between the belts 17 and 18 in the direction of the stop 26, this document will move over the belt 18 against the stop 26. A next document, which has been passed partly between the preceding document and the conveyor belt 17, will move over the preceding document and likewise abut against the stop 26 when the belt 17 is driven in the direction of the stop 26. Thus successive documents can be aligned relative to each other.

The system further comprises a folding station 32 for folding documents coming from the aligning station 16. Such a folding station is described in more detail in applicant's U.S. Pat. No. 5,090,671, which is incorporated herein by reference.

The pin of the transport roller 30 is pivotally suspended so that the transport roller can also serve as a pressure roller for keeping the documents to be folded pressed against one of the folding rollers of the folding station. Arranged opposite the transport roller 30 is a pivotable guide 41 which in an upwardly pivoted position guides documents to the gathering position and in a downwardly pivoted position allows documents to pass from the gathering position to the folding station.

To the folding station 32 connects an inserting station 33. This inserting station 33 is equipped with two trays 34, 35 for envelopes. As a basis for such an inserting station 33 the "in2" can be used, which is produced and marketed by applicant. A method for selecting an envelope tray for feeding an envelope depending on documents to be inserted, is described in applicant's European patent application 92200364.5, which is incorporated herein by reference.

In the preparation of a set of documents intended for a postal item using the system shown, the feeding stations F1–F6 feed documents to the transport units 3, 4. The aligning station 16 aligns the documents, forming a stack with document edges substantially aligned on one side. This stack is supplied to the folding station 32.

At least some of the documents to be gathered into a set can be fed at such moments that these, before being moved relative to each other downstream of the feeding stations 1, 2 and upstream of the folding station 32, are transported in a configuration in which those documents overlap each other and each next one of those documents projects relative to the preceding document in the same direction transverse to the edges to be aligned.

In that case, a number of the documents of a set, or possibly an entire set of documents, are gathered already upon being fed and are transported in gathered condition. As a result, a large number of documents can be transported simultaneously, which in turn offers the advantage that a large number of documents can be processed per unit time.

Each next document of a number of overlapping documents is staggered in the same direction relative to a preceding document. Thus corresponding edges of these documents can be readily aligned.

The documents are preferably fed in such a manner that during alignment a document which is smaller in a direction transverse to the document edges to be aligned is moved over a greater distance than a document that is greater in the direction referred to. This prevents a situation where during displacement of a large document a document whose edge has not been aligned yet and which is not carried along by that larger document retains its position or at any rate is not completely aligned.

For scanning brightness patterns of the documents as fed, which are separately transported to the aligning station 16, an optical detector 64 is arranged along the transport track 4 downstream of the feeding stations F1–F6 and upstream of the aligning station 16, this optical detector 64 being movable in transverse direction of the transport track and stationary in the longitudinal direction of the transport track.

For processing and storing the scanned brightness pattern, the apparatus comprises an analog-digital converter and an overwritable memory in which the converted signals can be stored.

The feeding of documents by the feeding stations F1–F6 and the transport of the documents along the transport tracks 3, 4, 36 and the belts 17 and 18 of the gathering station 16 is controlled by a control unit 37. The apparatus further comprises signal processing means 38 which are programmed for comparing a scanned brightness pattern with a reference brightness pattern stored in the memory. For this purpose, commercially available components can be used. In the apparatus according to the exemplary embodiment shown, the control unit 37 and the signal processing means 38 are integrated in the same data processor 39, which is connected with processors 42–47, associated with the feeding stations, for communication with those processors 42–47. In turn, the processors 42–47 associated with the feeding stations are designed for controlling the associated feeding stations F1–F6 on the basis of instructions received from the control unit 37. The last feeding station F6, which is designed as a printer, naturally comprises further processors for controlling the printing of the documents. The communication between the processor 47 associated with the last feeding station F6 and the printer only consists of commands to print and feed a next sheet and 'action completed' reports. The last feeding station may for instance be designed as a high-speed feeding station rather than a printer, without this making any difference to the communication with the control unit.

The method according to the invention can be used in the apparatus according to the exemplary embodiment shown, for various purposes. Two practical examples will hereinafter be described and elucidated partly with reference to the flow diagrams shown in FIGS. 2–4. In these flow diagrams the most essential steps of the two practical examples are shown.

The first practical example comprises determining the moment at which subsets composed of documents successively fed by the last station F6 and gathered in the gathering station 16, are to be discharged collectively by driving the belts 17, 18 and subsequently driving the transport means along the transport track 36. By discharging the supplied and gathered documents at the appropriate time, subsets with the intended composition are obtained and these can then be enveloped in the inserting station 33. If desired, the subsets can be completed to form complete sets by adding enclosure documents.

The second practical example comprises determining which of the insert feeding stations F1–F5 is to be actuated for the composition of a set with a specified configuration. Such a set can also comprise a subset consisting of one or more documents fed by the last feeding station F6 and gathered in a controlled manner through the above-described first practical example of the method according to the invention, but may also consist exclusively of documents coming from the insert feeding stations F1–F5.

The above-mentioned first practical example of the method according to the invention comprises a setting part and an operating part.

The first step 70 of the setting part is the input of a reference brightness pattern which is typical for a category or type of document that should be located in each subset at a fixed position relative to an end of that subset. For the sake of clarity, it is assumed hereinafter that that fixed position in each subset is always the position of the last document fed to the subset by the feeding station F6.

The above-mentioned reference brightness pattern is read from an exemplary document. Also the location of the document associated with the reference brightness pattern is read and inputted. In the apparatus shown, the documents are stacked face down, so that the last subset document fed by the station F6 is also the last document of a subset in terms of contents.

Figure 6:
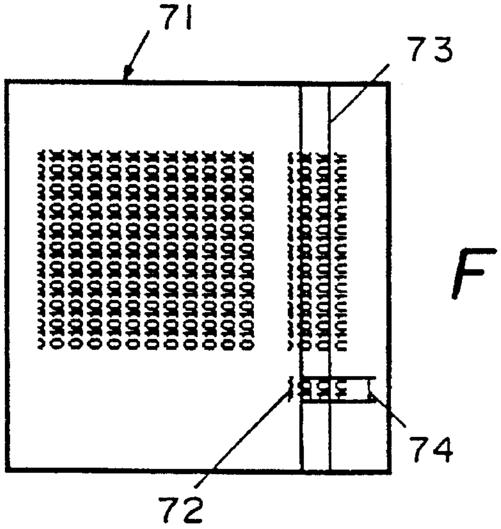
FIG. 6 is an example of a document with a fixed intended position relative to the end of each set.

A diagrammatic example of a typical last document is shown in FIG. 6 and designated by the reference numeral 71. Of a series of sheets collectively forming an account statement, the last sheet generally contains a balance 72 at a fixed position. If on the other sheets of each account statement nothing is printed at that position, the presence of a printing at that location constitutes a unique characteristic of the last document of each account statement. When setting the apparatus, the optical detector 64 (see FIG. 1) is arranged in such a manner that the document 71, while passing the detector 64, is scanned along a path 73. This path 73 extends over the indication of the balance 72. The balance 72 is printed at a fixed position relative to the upper edge or the lower edge of the document. The position and the size of a zone 74 of the path 73 where the balance 72 is printed and whose brightness pattern is to be scanned, should be set accordingly.

Scanning along the path 73 can for instance be carried out by signalling at a particular interval whether the brightness is below a specified limit value. This offers the advantages that the brightness pattern is simple to digitize, that the storage of a brightness pattern requires little storage space and that the brightness patterns are very simple to compare. Further, the information density of a brightness pattern may be very low because it is generally sufficient and even desirable not to scan a brightness pattern more than once every half millimeter. In practice, it is preferred to average over a distance greater than half the x height of common main text provided on documents.

Scanning along a path 73 extending in the direction of transport offers the advantage that it enables the use of a relatively simple scanner 64 which is stationary in the direction of transport.

In the method according to the present example, the presence of a balance 72 can be assumed, for instance, if the brightness in the zone 74 is at least once below the specified limit value. The pattern read from the document accordingly consists of the condition that at least one point of the brightness pattern represents a brightness lower than a specified limit value. The location associated with the brightness pattern indicates for which zone 74 of the path 73 that condition applies. To facilitate operation, this condition may for instance be specified as "other than white". The location of the zone 74 can for instance be determined by positioning a template, associated with the apparatus, with a squared pattern provided with numbers, over the document in a prescribed manner and to read on the basis thereof how the position of the optical detector is to be set and between which lines the zone 74 of the balance 72 is located.

Reading the reference brightness pattern can also take place by specifying the location of the zone 74 and passing the document along an optical detector 64 which has been set accordingly. If the latter performs its detection through a sufficiently large window, a distinction can be made between brightness patterns of documents on which a balance 72 is printed and documents on which no balance 72 is printed, while differences between brightness patterns scanned from documents on which different balances 72 are printed are limited to such an extent that they are recognized as being correspondent with the reference brightness pattern.

Parts of the path 73 not located inside the path 74 are left out of consideration. These may accordingly be provided with any arbitrary printing without thereby affecting the distinction between documents that are the last to be supplied and other documents.

The brightness pattern identifying a last document of a set can also be read from an exemplary document of a document type or category that is to be supplied as a last document in each case. Thus, a wide variety of patterns can be used for recognizing a last document. Other printings which are often typical for a last sheet and which can be used for detecting each last document of a subset include, for instance, the presence in a particular zone of a word as 'total' or a relatively thick line under which the total balance is stated. If the last document is a page of a letter, the absence of an indication which page is to follow (for instance: ./3) or the closing part of the letter with room for signing can be used for recognizing a last page.

If the path 73 extends through a portion of the documents that is identical for all documents except the last document of each subset, it is also possible to read a brightness pattern corresponding with the entire path and enter it without associated data regarding its location. Even in the case where the last document of each subset comprises a specific printing which yields a unique brightness pattern during scanning but which is not always located in the same place, the entry of the location of the brightness pattern can be omitted.

The reference brightness pattern as read is stored in combination with the associated location. This step is designated by the reference numeral 75. As appears from the foregoing, the reading and storing of a location associated with the reference brightness pattern can sometimes be omitted.

With the step 75 of storing the reference brightness pattern and, if applicable, the location thereof, the setting part of this example of the method according to the invention is completed. The settings can, if desired, be stored in a non-volatile memory, so that they can be used again for a next, corresponding production run and reading, entering and storing the reference brightness pattern for a next, corresponding run need not be repeated every time.

Essentially, the operating part of this example of the method according to the invention has two basic cycles. Each cycle starts with the last feeding station, the printer F6, feeding a document. This step is designated by reference numeral 76. The document is passed along the optical detector 64, where a brightness pattern of the document is scanned and simultaneously the location of the detector 64 relative to the document is monitored, as designated by reference numeral 77.

The next step 78 comprises comparing the stored reference brightness pattern and the scanned brightness pattern for at least a zone as defined by the stored data with regard to the location. The comparison can for instance comprise the comparison of a number of corresponding points of the brightness pattern and the calculation of a particular average difference. It is also possible to count the number of points whose brightness lies outside a stored associated tolerance range. The tolerance range may be limited on one side as well as on two sides, as appears from what has been decribed with regard to the exemplary document 71 shown in FIG. 6.

In order to avoid a comparison between mutually offset brightness patterns—and hence a seemingly enlarged difference between the patterns—the scanned brightness pattern can be shifted, and optionally rotated too, within a particular range, until a minimal difference between the brightness patterns, or at least the zones thereof that are to be compared, is obtained. The extent of the range is preferably adapted to the tolerance in the scanning direction of the brightness patterns having been read and scanned.

The next step 79 comprises comparing the outcome of the comparison represented by step 78 with a specified maximum difference. This maximum difference can equal zero if the brightness patterns have been acquired by reading and scanning through a window of sufficient size, which may or may not have been acquired through calculation, and allowable tolerances have already been taken into account in the comparison itself. If such is not the case, a greater allowable difference can be used as a criterion.

If the resultant difference is greater than the maximum difference, no agreement is assumed and the first basic cycle is completed. This cycle is now started again with the step 76: the feeding of a next document which, after being scanned, is added to the document which has just passed.

When the resultant difference is smaller than the maximum difference, it is determined whether the enclosure routine is active (step 80). If the enclosure routine is active, it is traversed (step 81). The enclosure routine 81 will be described in more detail hereinafter with reference to FIG. 4 and forms a part of the above-mentioned second practical example of the method according to the invention.

If the enclosure routine 81 is not active, optionally, after all documents of a set coming from the last feeding station F6 have been fed, feeding stations F1–F5 feed enclosure documents according to a selected setting of the apparatus (step 82). Such setting can for instance comprise the feeding of a single document for each set from the stations F1 and F3. In addition, or instead, it is for instance possible that the feeding of documents for a particular set by particular feeding stations is implemented or not in dependence upon the number of documents fed to that set by the last feeding station F6, all this to provide for optimum utilization of a weight class associated with a particular franking value or at any rate to avoid an upper limit of a particular weight class being exceeded.

After the enclosures, if any, have been fed, the discharge track is activated (step 83) for discharging the gathered documents as a set. In the apparatus according to the exemplary embodiment shown in FIG. 1, this means that the conveyor belts 17, 18 of the gathering station are driven. The flap 41 may be swivelled down to pass the gathered set of documents between the first pair of folding rollers of the folding station 32 or may be swivelled upwards for bringing the documents between the folding rollers and the pressure roller 30 in order to fold the documents between the folding rollers.

When the documents have been discharged from the gathering station, the second basic cycle has been completed and documents for a next set can be fed. The above-mentioned second basic cycle thus comprises one or more times the above-mentioned first basic cycle as well as the addition of enclosure documents.

Figure 5:
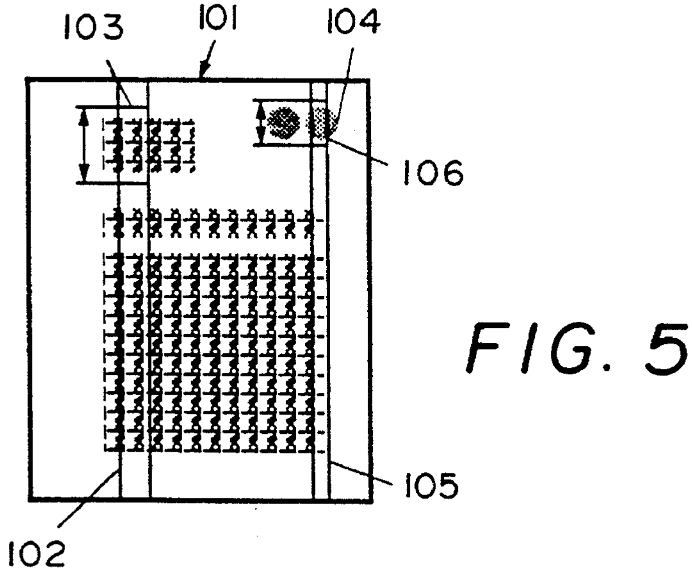
FIG. 5 is an example of a document with a fixed intended position relative to the beginning of each set.

FIG. 5 shows a further exemplary document 101 with a fixed position relative to the beginning or the end of each set. According to this example 101, the type of document with the fixed position is a first sheet of a letter. Such a type of document may for instance be recognized in that it contains an address which, upon being scanned, shows a brightness pattern with a particular number of dips surrounded by longer plateaus and/or peaks. This brightness pattern can be acquired by scanning along a path 102 and storing the part of the brightness pattern in the zone 103 of that path 102. A different printing on the first page, other than the address, which generally yields a unique brightness pattern is in many cases a logo 104. The brightness pattern thereof can be obtained by scanning along a path 105 and storing the part of the brightness pattern in the zone 106 of that path 105.

A first page of a letter can be fed as the last document of a set if the documents, when being gathered, are stacked with the printed side up. If the documents, when being gathered, are stacked with the printed side down, a first page of a letter should generally form the first document of a set. For that purpose, the above-described first practical example should be carried out in a modified form. In accordance with this modification, in response to the scanning of a brightness pattern corresponding with the stored reference brightness pattern, the document from which that brightness pattern has been scanned is not transported to the gathering station until the documents gathered there have been collectively discharged as a set. When the apparatus according to FIG. 1 is used, the documents coming from the feeding stations F1–F5 are preferably fed before the documents belonging to the same set are fed by the printer F6. It is also possible, however, to gather the documents coming from the stations F1–F5, mostly enclosure documents, as a separate set and not to add them to the documents coming from the printer F6 until they have reached the inserting station 33, for instance by inserting them in the same envelope.

Figure 3:
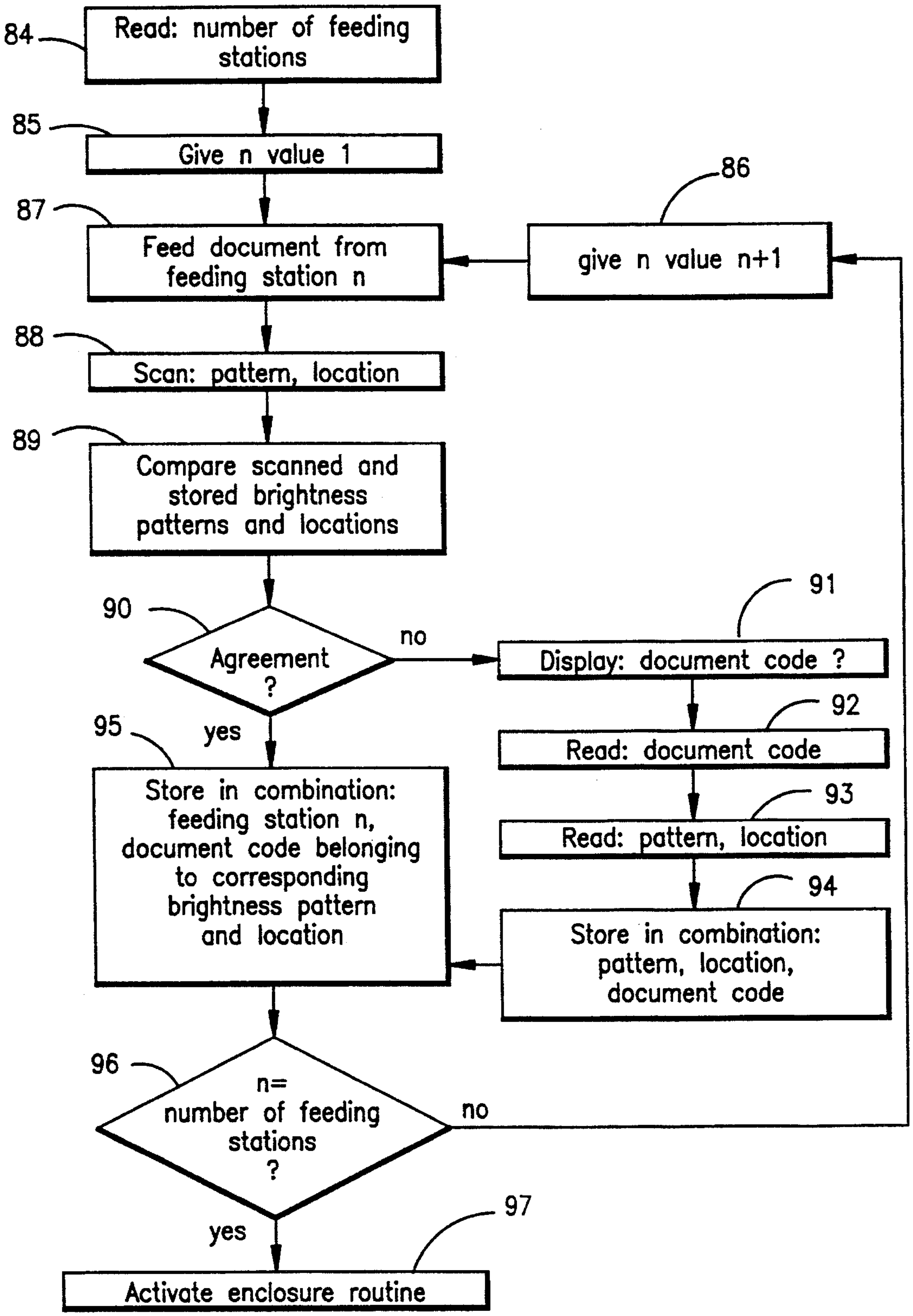
FIG. 3 is a flow diagram representing a setting part of a second method according to the invention.
Figure 4:
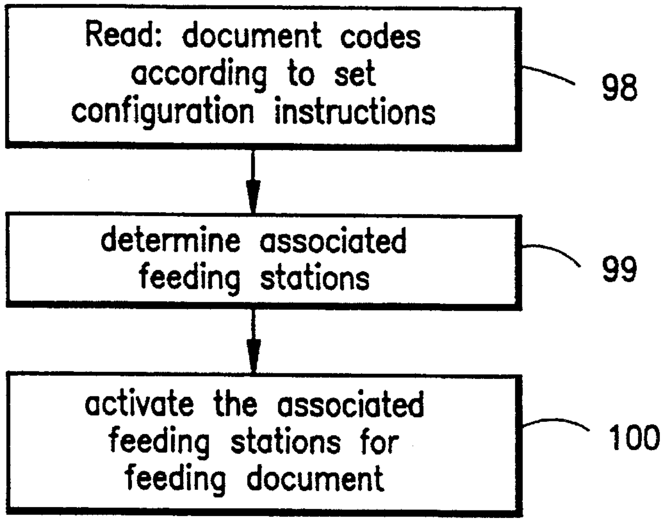
FIG. 4 is a flow diagram representing the operating part of the second method according to the invention.

The above-mentioned second practical example of the method according to the invention also comprises a setting part (see FIG. 3) and an operating part (see FIG. 4).

Figure 2:
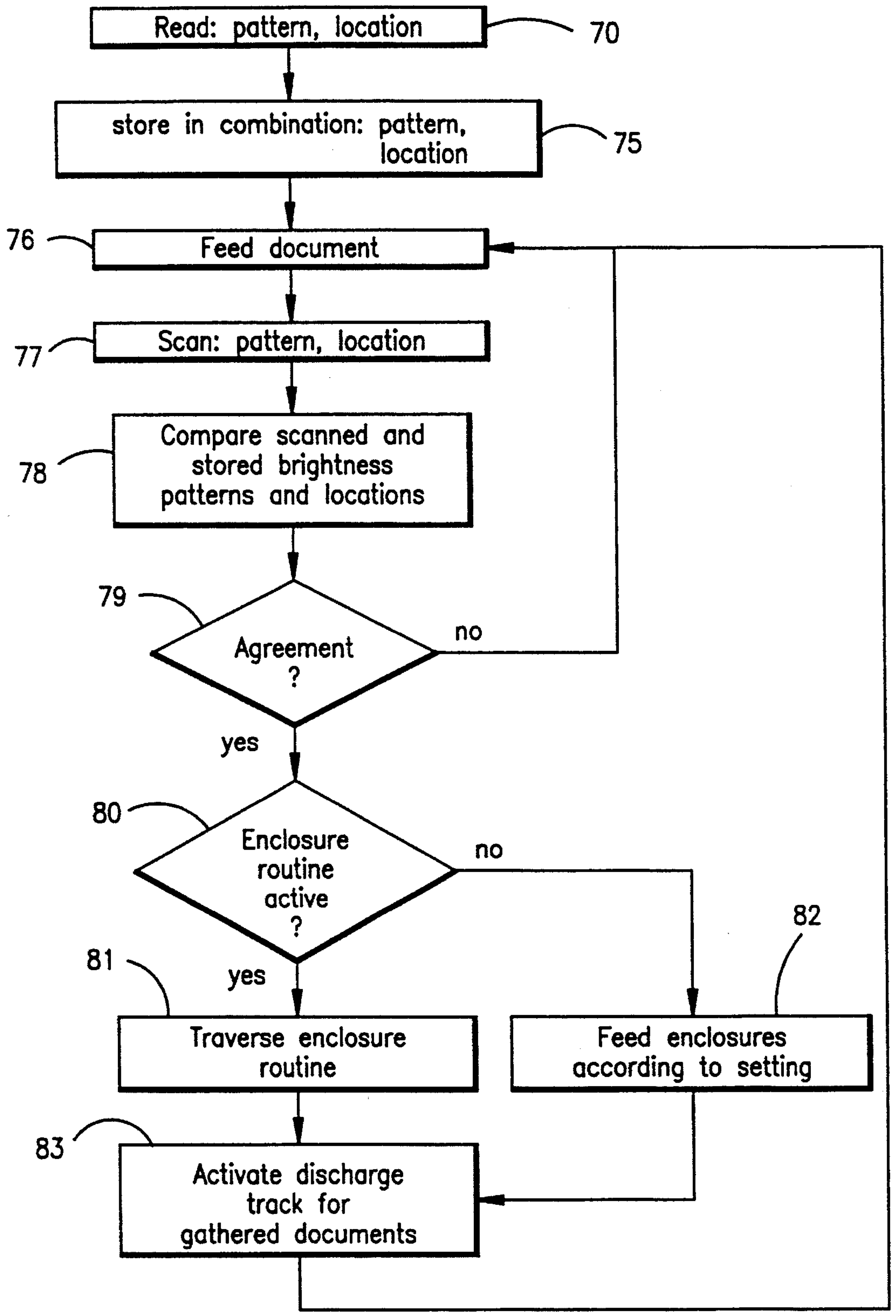
FIG. 2 is a flow diagram representing a method according to the present invention.

The first step 84 of the setting part comprises determining the number of feeding stations. Alternatively, this number may be fixed, a non-placed feeding station being considered and treated as an empty feeding station. According to the present exemplary embodiment, exclusively the insert feeding stations F1–F5 adapted for feeding preprinted documents are taken into account. The feeding station F6, designed as a printer, is controlled separately according to the above-described first practical example of the method according to the invention as shown in FIG. 2.

A counter n is set at 1 (step 85). This counter monitors to which of the feeding stations the basic cycle of the setting part of the second practical example relates and is raised each time a basic cycle for a particular feeding station has been completed (step 86).

The basic cycle of this practical example each time starts with feeding an exemplary document from the feeding station n to which the basic cycle relates (step 87).

The document as fed is transported individually along the optical detector 64, located downstream of the feeding stations, where a brightness pattern of that document is scanned and simultaneously the location of the detector 64 relative to the document is monitored. In addition to the brightness pattern, other data regarding the document, such as length and thickness, may be stored as well. These data can subsequently be used in combination with the scanned brightness pattern.

Then the scanned brightness pattern, or at any rate at least a part thereof, is compared with reference brightness patterns stored in a memory, as is designated by step 89. The results of the comparisons are used in step 90 for determining whether the scanned brightness pattern corresponds with one of the stored reference brightness patterns.

If no reference brightness pattern has been stored yet or if no agreement with one of the stored reference brightness patterns has been found, an input routine for storing the scanned brightness pattern in combination with an associated document code is initiated. This routine comprises the retrieval of the document code by displaying a suitable text or pictogram on a display (step 91), reading the inputted document code (step 92), reading the scanned brightness pattern and, if applicable, the associated location (step 93) and storing these data in combination with each other (step 94). This input routine is followed by step 95 of storing data representing which documents are located in the feeding station n to which the basic cycle in question relates. These data consist of combinations of identificatory designations of feeding stations and document codes; the feeding stations may for instance have been identified on the basis of the associated address signals or communication channels.

If, on the other hand, during the check 90 a stored reference brightness pattern has been found which corresponds with the scanned brightness pattern, the procedure proceeds directly to step 95 of storing the document code in combination with the identificatory designation of the relevant feeding station to which the basic cycle in question relates.

Each time it has been determined for a feeding station what document code is associated with it, the counter n is compared with the determined number of feeding stations (step 96). If the counter n is not equal to the number of feeding stations, the counter n is raised through step 86 and the basic cycle is traversed again for the next feeding station. For empty feeding stations or stations treated as being empty, non-present feeding stations, a separate cycle may be provided which leads directly to step 86 again. If the counter n does equal the number of feeding stations, the setting part is ended by activating a parameter indicating whether the enclosure routine is in operation (step 97). The consequence of the activation of the enclosure routine is that in the first practical example described above and shown in FIG. 2, the feeding of enclosures is controlled by the enclosure routine 81.

This enclosure routine 81 also forms the operating part of the present second practical example of the method according to the invention and is described in more detail hereinbelow with reference to FIG. 4.

The enclosure routine starts with reading the document codes associated with a set to be composed, as included in set configuration instructions (step 98).

The set configuration instructions may for instance have been read by scanning a main document. Such scanning can be carried out with the same optical detector 64 as used for scanning the brightness patterns for determining the moment of discharge of the gathered documents and for determining which documents are located in which feeding stations. If it is desired to scan the brightness pattern along a different track than the set configuration instructions, it may for that purpose be more advantageous to use separate optical detectors which may be of the same type or a different type.

However, there are many other possible ways of obtaining the set configuration instructions. Thus, for instance, the name of the addressee can be recognized prior to or after printing and be coupled to associated set configuration instructions which are stored in a database and which indicate which enclosures are to be sent to that addressee. The above-mentioned database may optionally monitor which enclosures that addressee has received previously, to thereby avoid the same enclosures being sent to the same addressee several times. The set configuration instructions may also be coupled as a separate set of data to the printing instructions which are sent to the printer F6 and which are diverted to the control system of the apparatus for composing the sets.

After it has been read which document codes belong to a particular set, it is determined, on the basis of the stored combinations of document codes and feeding stations, which feeding stations belong to the document codes mentioned in the configuration instructions of the relevant set (step 99).

On the basis of the thus established list of feeding stations, finally, as represented by step 100, the feeding stations according to that list are activated for feeding documents, which are transported to the gathering station 16 and are gathered there. Possibly, documents coming from the feeding station F6 may already be present in the gathering station. Then the documents are discharged collectively as has been described with reference to step 83 of the first practical example of the method according to the invention.

Thus the system itself determines which feeding stations are to be controlled in order to include the proper enclosure documents in a set. Neither the operator of the system nor the person responsible for determining which enclosure documents are to be included in a set, need to be concerned with this.

Because the documents are identified on the basis of random brightness patterns scanned from the documents without any independent meaning, it can thus be determined which document is located in a feeding station, without requiring that the document be provided with special marks intended for mechanized identification.

The scanned brightness patterns need only be compared with a limited number of reference brightness patterns stored in a memory, so that no complex recognition methods need to be carried out.

In order to check whether the proper enclosure documents are being fed, documents being fed by the feeding station F1–F5 can, in succession or through spot-checks, be individually transported along the optical detector 64 and scanned. In this way it can for instance be determined, after a feeding station has been reloaded, whether the correct documents have been loaded.

If the documents are transported individually only through spot checks, they can, during the operating part, for the rest be fed by the feeding stations F1–F5 at such moments that they overlap during transport to the gathering station 16. Thus the time required for composing a set can be limited.

If it has been predetermined which documents are to be fed by which of the feeding stations F1–F5, the check of the documents fed by those stations by scanning them can also be carried out when a document is being fed by a particular feeding station for the first time during a run. In that case, that document is individually transported and scanned. This provides the advantage that the setting part of the method according to the second practical example can be omitted at start-up, which saves time. The setting part can also be omitted insofar as the same documents are loaded in the feeding stations F1–F5 as during a previous run, of which the loading data are known, for instance if between two runs nothing has changed regarding the load of the feeding stations F1–F5.

It is noted that in the present example the method according to the second practical example has been incorporated into a method according to the first practical example. However, it is also possible to carry out the methods according to these practical examples separately or to incorporate the method according to the first practical example as a component into a method according to the second practical example.

Further, it is possible, instead of scanning a brightness pattern in one particular wavelength range, to scan several brightness patterns in different wavelength ranges. Thus, colored printing in particular, such as color photographs and colored logos, can be properly distinguished.

It is further possible to store in a memory two or more reference brightness patterns in association with a corresponding control code. This makes it possible to recognize different documents each with its own particular fixed intended position relative to the beginning or end of a set and to carry out the discharge of the gathered documents at such a moment that both recognized documents assume the intended positions in the set of gathered documents. If it is desired, for instance, that a particular type of document in each case constitutes the antepenultimate document of a set, then the control code associated with the reference brightness pattern of that document can contain the instruction for feeding another two documents and subsequently discharging the gathered documents collectively.

The control codes each associated with a reference brightness pattern may differ from each other, each control code being associated with an integer greater than or equal to zero, this number indicating the number of documents yet to be fed in response to the signal associated with the control code, before the documents as fed and gathered are discharged.

Several reference brightness patterns may each be stored in a memory in association with a corresponding document code. In this connection, prior to the gathering of a particular series of sets, at least one document code stored in association with one of the stored reference brightness patterns can be selected, whereafter during the composition of that series of sets the scanned brightness patterns are compared with the reference brightness pattern stored in association with the selected document code. Thus, for a number of document types or categories that occur more often, the reference brightness pattern and the desired position in each set can be stored and inputted from the memory prior to the composition of a series of sets. This renders it unnecessary to read the reference brightness pattern from a document and to input it anew for each run, while yet enabling the composition of different types and categories of documents at different desired positions in the sets.

Further aspects and features of the present invention appear from the appended claims.

I claim:

1. A method for assembling sets of documents, comprising the steps of:

storing a plurality of reference brightness patterns, each in association with a document code corresponding to a specific type or category of documents;

subsequently, loading documents of at least one of said specific types or categories into one of a plurality of feeding stations;

storing at least one feeding station code identifying a feeding station in association with a document code of one of said specific types or categories of documents loaded in that feeding station;

subsequently, reading set configuration instructions including at least one selected document code;

selecting at least one feeding station identification code stored in association with said at least one selected document code;

feeding at least one document from at least one of said feeding stations designated by said at least one selected feeding station identification code;

optically scanning a brightness pattern from at least parts of said at least one document fed from said at least one feeding station;

comparing the scanned brightness pattern with the reference brightness pattern or patterns stored in association with the respective selected document code or codes;

generating at least one signal signifying whether a specified minimum extent of agreement between the compared brightness patterns has been found; and including said at least one document into a set if said signal signifies that said specified minimum extent of agreement between the compared brightness patterns has been found.

2. A method for assembling sets of documents, comprising the steps of feeding a plurality of documents and gathering at least some of said documents into sets with preselected compositions, wherein:

optically scanning brightness patterns from at least parts of at least some of said documents, comparing each of said scanned brightness patterns with at least one reference brightness pattern of a specific type or category of documents, said reference brightness pattern or patterns being stored in a memory, generating signals signifying whether a specified minimum extent of agreement between the compared brightness patterns has been found, and controlling the composition of gathered sets of documents in accordance with said signals, wherein said reference brightness pattern is obtained by scanning from an exemplary copy of the type or category of documents using a photosensitive scanner, which scanner is subsequently also used for the scanning of the brightness patterns which are compared with the at least one stored reference brightness pattern.

3. A method for assembling sets of documents, comprising the steps of feeding a plurality of documents and gathering at least some of said documents into sets with preselected compositions, wherein:

optically scanning brightness patterns from at least part of at least one of said documents, comparing each of said scanned brightness patterns with at least one reference brightness pattern of a specific type or category of documents, said at least one reference brightness pattern being stored in a memory, generating signals signifying whether a specified minimum extent of agreement between the compared scanned and reference brightness patterns has been found, and controlling the composition of gathered sets of documents in accordance with said signals, wherein scanning of the brightness patterns includes calculating a running average over a detection interval of at least 0.5 mm.

4. A method for assembling sets of documents, comprising the steps of feeding a plurality of documents and gathering at least some of said documents into sets with preselected compositions, wherein:

optically scanning brightness patterns from at least parts of at least one of said documents, comparing each of said scanned brightness patterns with at least one reference brightness pattern of a specific type or category of documents, said at least one reference brightness pattern being stored in a memory, generating signals signifying whether a specified minimum extent of agreement between the compared scanned and reference brightness patterns has been found, and controlling the composition of gathered sets of documents in accordance with said signals, wherein scanning of the brightness patterns is carried out through a window, the documents are passed along the window in a direction of transport and the window measures at least 0.5 mm in the direction of transport.

5. A method for assembling sets of documents, comprising the steps of:

storing a plurality of reference brightness patterns in a memory, each in association with a document code corresponding with a specific type or category of documents;

subsequently, loading documents of at least one of said specific types or categories into at least one of a plurality of feeding stations;

optically scanning a brightness pattern from at least parts of at least one document of at least one of said types or categories of documents loaded into said feeding station or stations;

comparing the at least one scanned brightness pattern with at least one of said reference brightness patterns;

generating at least one signal signifying whether a specified minimum extent of agreement between the compared brightness patterns has been found, wherein, if said specified minimum extent of agreement between a particular one of the scanned brightness patterns and a particular one of the reference brightness patterns is found, said signal represents the document code associated to said particular reference brightness pattern;

storing at least one feeding station code in a memory in association with the document code represented by said signal, said at least one feeding station code identifying the feeding station provided with documents of said specific type or category from which said particular brightness pattern has been scanned;

subsequently, reading set configuration instructions including at least one selected document code;

selecting at least one feeding station identification code stored in association with said at least one selected document code;

feeding at least one document from said at least one selected feeding station designated by said at least one selected feeding station identification code; and including said at least one document fed in accordance with said set configuration instructions in a set.

6. A method according to claim 5, wherein, after being fed, the documents are transported in a direction of transport along at least one stationary photosensitive scanner and the brightness pattern is scanned during transportation.

7. A method according to claim 6 wherein, said set configuration instructions including a selected document code are read by also passing a main document along said photosensitive scanner, scanning marks on said main document using said scanner, and converting said scanned marks into set configuration instructions.

8. A method according to claim 5, wherein:

the feeding of at least a subset of the documents is carried out successively from a common source, and in reaction to a signal signifying that the specified minimum extent of agreement between the compared brightness patterns has been found, the gathered documents are discharged as a set at such a moment, that the document of which the scanned brightness pattern showed the specified minimum extent of agreement with the stored reference brightness pattern occupies a predetermined position relative to the beginning or the end of said subset or of a next subset of documents.

9. A method according to claim 8, wherein at least two reference brightness patterns are stored, each in association with a particular control code.

10. A method according to claim 9, wherein at least two of said particular control codes are mutually different, each of said control codes being associated with an integer value greater than or equal to zero, said integer value indicating the number of documents to be fed and gathered between a signal associated with the respective code and the discharge of the gathered documents.

11. A method for assembling sets of documents, comprising the steps of:

storing a plurality of reference brightness patterns in a memory, each in association with a document code;

selecting at least one of said document codes;

feeding and collecting a plurality of documents, wherein at least some of said documents are fed successively from a common source;

optically scanning brightness patterns from at least parts of said documents from said common source;

comparing the scanned brightness patterns with the reference brightness pattern stored in association with the selected document code;

generating signals signifying whether a specified minimum extent of agreement between the compared brightness patterns has been found; and controlling the composition of sets of documents in accordance with said signals by discharging collected documents as a set responsive to a signal signifying that the specified minimum extent of agreement between the compared brightness patterns has been found, wherein the discharging is carried out at such a moment, that each document of which the scanned brightness pattern showed the specified minimum extent of agreement with the compared reference brightness pattern occupies a predetermined position relative to the beginning or the end of a collected and discharged set of documents fed from said common source.

12. A method according to claim 11, wherein a reference brightness pattern to be stored is obtained by positioning a template with a pattern defining a plurality of boxes over the document, visually determining brightness values of the document in at least two specified ones of said boxes, and inputting and storing said determined values as reference brightness values for said specified boxes.

13. A method according to claim 12, wherein each stored reference brightness value is a minimum or maximum limit value.

14. A method according to claim 11, wherein data defining the location of a brightness pattern on a document are stored in association with at least one of the reference brightness patterns.

15. A method according to claim 11, wherein the brightness patterns are each composed of a plurality of successive binary values, each of said values indicating whether the average scanned brightness in a specific section of a document is greater than or smaller than a limit brightness value for that section.

16. An apparatus for assembling sets of documents, comprising:

a plurality of feeding stations for feeding documents, each feeding station being provided with a store-tray for accommodating a plurality of documents to be fed;

a transport track for transporting documents received from said feeding stations;

a control unit for controlling said feeding stations and the transport track;

an optical scanner for scanning a brightness pattern from a document, said scanner being arranged along the transport track downstream of said feeding stations for scanning documents fed from said feeding stations;

a memory tier storing a plurality of reference brightness patterns, each in association with a document code, and a plurality of document codes, each in association with a feeding station code;

means for inputting the reference brightness pattern in the memory;

signal processing means programmed for comparing a scanned brightness pattern with a reference brightness pattern stored in the memory and for generating signals signifying whether a specified minimum extent of agreement between the scanned brightness pattern and the reference brightness pattern stored in the memory is found;

the signal processing means being coupled to the control unit for transmitting said signals to the control unit; and the control unit being coupled with each of said feeding stations for sending commands to the feeding stations and being programmed for sending commands to the feeding stations in accordance with inputted set configuration instructions including selected document codes and in accordance with feeding station codes stored in association with said selected document codes.

17. An apparatus according to claim 16, wherein the photosensitive scanner is stationary in longitudinal direction of the transport track.

18. An apparatus according to claim 16, comprising a gathering station located downstream of the feeding stations, the optical scanner being located downstream of the feeding stations and upstream of the gathering station.

19. An apparatus according to claim 16, comprising a gathering position located downstream of the feeding station or stations, the transport track being adapted for groupwise discharging gathered documents from the gathering position, and the control unit being programmed for activating the transport track in reaction to said signals if said signals indicate that said minimum extent of agreement between the scanned brightness pattern and the reference brightness pattern has been found.

* * * * *